(12) United States Patent
Dommety et al.

(10) Patent No.: US 7,602,786 B2
(45) Date of Patent: Oct. 13, 2009

(54) METHODS AND APPARATUS FOR OPTIMIZING MOBILE VPN COMMUNICATIONS

(75) Inventors: Gopal Dommety, San Jose, CA (US); Alpesh Patel, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 605 days.

(21) Appl. No.: 11/177,454

(22) Filed: Jul. 7, 2005

(65) Prior Publication Data

US 2007/0008980 A1   Jan. 11, 2007

(51) Int. Cl.
*H04L 12/28* (2006.01)
(52) U.S. Cl. .................. 370/392; 370/338; 370/401; 455/433
(58) Field of Classification Search .............. 455/433, 455/432.1
See application file for complete search history.

(56) References Cited

U.S. PATENT DOCUMENTS

| 2004/0037260 A1 | 2/2004 | Kakemizu et al. |
| 2004/0073642 A1* | 4/2004 | Iyer ........................... 709/223 |
| 2006/0034297 A1* | 2/2006 | O'Neill .................. 370/395.53 |
| 2006/0130136 A1* | 6/2006 | Devarapalli et al. ........... 726/15 |

OTHER PUBLICATIONS

C. Perkins, Editor, "IP Mobility Support", RFC 2002, Oct. 1996, 71 pages.
C. Perkins, Ed., "IP Mobility Support for IPv4", RFC 3344, Aug. 2002, 93 pages.
D. Johnson et al., "Mobility Support in IPv6", RFC 3775, Jun. 2004, 155 pages.
K. Egevang and P. Francis, "The IP Network Address Translator (NAT)" RFC 1631, May 1994, 10 pages.
S. Vaarala, Ed., "Mobile IPv4 Traversal Across IPsec-based VPN Gateways", http://www3.ietf.org/proceedings/04nov/IDs/draft-ietf-mip4-vpn-problem-solution-00.txt, 47 pages.
H. Levkowetz and S. Vaarala, "Mobile IP Traversal of Network Address Translation (NAT) Devices", RFC 3519, Apr. 2003, 27 pages.
International Search Report dated Feb. 15, 2007, from PCT Application No. PCT/US 06/26810, 3pp.
Written Opinion of the International Searching Authority, dated Feb. 15, 2007, from PCT Application No. PCT/US 06/26810, 3 pp.

* cited by examiner

*Primary Examiner*—Duc C Ho
(74) *Attorney, Agent, or Firm*—Weaver Austin Villeneuve & Sampson LLP

(57) ABSTRACT

Methods and apparatus for optimizing Mobile VPN communications are disclosed. When a data packet is transmitted between a Mobile Node that is a member of a VPN and a Correspondent Node, the data packet is transmitted between the Mobile Node and a Home Agent via a Mobile IP tunnel without transmitting the data packet via a VPN tunnel. However, the data packet is transmitted between the Home Agent and a VPN headend via a VPN tunnel.

40 Claims, 8 Drawing Sheets

METHODS AND APPARATUS FOR OPTIMIZING MOBILE VPN COMMUNICATIONS

BACKGROUND OF THE INVENTION

The present invention relates to Mobile IP network technology. More specifically, this invention relates to mechanisms for optimizing communications between a Mobile Node supporting Mobile IP and a Correspondent Node, where the Mobile Node is a member of a Virtual Private Network (VPN).

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process in a Mobile IPv4 environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In the absence of a Foreign Agent, the Mobile Node 6 can obtain a topologically correct IP address (i.e., collocated IP address) and register this IP address with the Home Agent. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

The Mobile IP protocol for Ipv6 has been described in RFC 3775, entitled "Mobility Support in Ipv6," published in June 2004, by Johnson et al. RFC 3775 discloses a protocol which allows nodes to remain reachable while roaming in IPv6. RFC 3775 is incorporated herein by reference for all purposes. As disclosed in "Mobility Support in IPv6," the Home Agent generally advertises its address, which is obtained by a Mobile Node. In Mobile Ipv6, there is no Foreign Agent. However, an access router 10 is present to provide connectivity to the network. The Mobile Node then sends a Binding Update message to the Home Agent. The Home Agent then sends a Binding Acknowledgement message to the Mobile Node. The Binding Update and Binding Acknowledgement messages are protected in IPSec transport mode. The Home Agent creates a binding cache entry and a tunnel is established between the Mobile Node's care-of address and the Home Agent. When a Correspondent Node sends a packet to the Mobile Node, it is forwarded to the Mobile Node by the Home Agent via the tunnel that has been established.

Mobile operators and service providers assign private IP addresses to their subscribers. More specifically, mobile operators worldwide typically use private Dynamic Host Configuration Protocol (DHCP) or PPP IP Control Protocol (IPCP) address assignment to their mobile users due to the lack of IP addresses. When the users are accessing the internet, the private IP address assigned to a user is translated to a public address at the edge of the private network before the packets are sent via the internet. This function is typically referred to as Network Address Translation (NAT).

In a virtual private network (VPN), addresses used within the network are typically private IP addresses. In order for nodes within the VPN to communicate with nodes outside the VPN, NAT is typically performed to convert private to public addresses and vice versa. This address conversion is performed by a NAT module or device as set forth in RFC 1631, entitled "The IP Network Address Translator (NAT)," published in May 1994 by Egevang et al, which is incorporated herein by reference for all purposes.

Internet draft entitled, "Mobile IPv4 Traversal Across IPsec-based VPN Gateways" by S. Varaala and Stinghorn, published on Sep. 28, 2004, and available at "http://www1.etf.org/proceedings_new/04nov/IDs/draft-ietf-mip4-vpn-problem-solution-00.txt," discloses a layered solution for VPN traversal, and is incorporated herein by reference for all purposes. Specifically, this solution requires two layers of tunneling at mobility layers and an additional layer of tunneling at the VPN layer. The first Mobile IP tunnel exists between the Home Agent and the Mobile Node to provide mobility inside the enterprise. A second Mobile IP tunnel exists between the Home Agent and the Mobile Node when the Mobile Node moves outside the enterprise network. In addition, a VPN tunnel also exists between the Mobile Node and a VPN headend. The VPN headend is also sometimes referred to as a "VPN concentrator." The VPN headend is a network device that manages information associated with a VPN session. The VPN tunnel associated with a Mobile Node terminates at the VPN headend. In order to create a VPN session, a VPN client attaches to the VPN headend.

Since the VPN tunnel and the second Mobile IP tunnel are required when the Mobile Node roams outside the VPN, two different tunnels are used simultaneously to transport data between the Mobile Node and the VPN headend. These two layers of encapsulation result in significant overhead, particularly on wireless links.

In view of the above, it would be beneficial if Mobile VPN communications could be optimized.

SUMMARY OF THE INVENTION

Methods and apparatus for optimizing Mobile VPN communications are disclosed. This is accomplished, in part, by tunneling data packets between a Mobile Node and its Home Agent via a single tunnel, rather than two different tunnels, where the Mobile Node is a member of a VPN. In this manner, Mobile VPN communications are optimized.

In accordance with one aspect of the invention, when a data packet is transmitted between a Mobile Node that is a member of a VPN and a Correspondent Node, the data packet is transmitted between the Mobile Node and a Home Agent via a Mobile IP tunnel without transmitting the data packet via a VPN tunnel. However, the data packet is transmitted between the Home Agent and a VPN headend via a VPN tunnel.

In accordance with one embodiment, a Home Agent supports data communications from a Mobile Node to a Correspondent Node. Specifically, the Home Agent receives a data packet from a Mobile Node via a Mobile IP tunnel. The Home Agent changes a source address of the data packet from the Mobile Node's care-of address to the Mobile Node's home address, and changes a destination address of the data packet from the address of the Home Agent to an address of a VPN headend. The Home Agent then transmits the data packet to the VPN headend via a VPN tunnel.

In accordance with another embodiment, the Home Agent supports data communications from a Correspondent Node to a Mobile Node. Specifically, the Home Agent receives a data packet from a VPN headend via a VPN tunnel. The Home Agent changes a source address of the data packet from an address of a VPN headend to an address of the Home Agent. In addition, the Home Agent changes a destination address of the data packet from a home address of the Mobile Node to a care-of address of the Mobile Node. The Home Agent then transmits the data packet to the care-of address of the Mobile Node via a Mobile IP tunnel.

In accordance with another aspect of the invention, a Mobile Node supports data communications by the Mobile Node to a Correspondent Node. Specifically, a method of optimizing Mobile IP communications includes generating (or receiving) a data packet, setting up a Mobile IP tunnel, setting up a VPN tunnel, and transmitting the data packet to the Home Agent via only the Mobile IP tunnel. The VPN tunnel may thereafter be used to tunnel packets to the Mobile Node (e.g., from a Correspondent Node).

In accordance with yet another aspect of the invention, a Mobile Node supports data communications by a Correspondent Node to the Mobile Node. Specifically, in accordance with one embodiment, the Mobile Node receives a data packet from a Home Agent at a Mobile IP layer of the Mobile Node via a Mobile IP tunnel. The Mobile Node modifies a source address of the data packet from an address of a Home Agent to an address of a VPN headend. The Mobile Node also modifies a destination address of the data packet from a care-of address of the Mobile Node to a home address of the Mobile Node. The Mobile Node then forwards the modified data packet to a VPN client of the Mobile Node such that the data packet appears as if it originated at the VPN headend.

In accordance with another aspect of the invention, the invention pertains to a system operable to perform and/or initiate optimized Mobile VPN communications between a Mobile Node and a Correspondent Node, where the Mobile Node is a member of a VPN. The system includes one or more processors and one or more memories, which may be implemented in a Mobile Node, Home Agent, and/or VPN headend. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Embodiments of the invention support optimized Mobile VPN communications. This is accomplished through "collapsing" two tunnels into a single tunnel such that data packets are transmitted between two nodes via a single tunnel rather than two different tunnels, where at least one of the nodes is a member of a VPN. In accordance with various embodiments disclosed herein, data packets transmitted between a Mobile Node and its Home Agent are transported via a Mobile IP tunnel without tunneling the data packets between the Mobile Node and the Home Agent via a VPN tunnel, where the Mobile Node is a member of a VPN.

Figure 2:
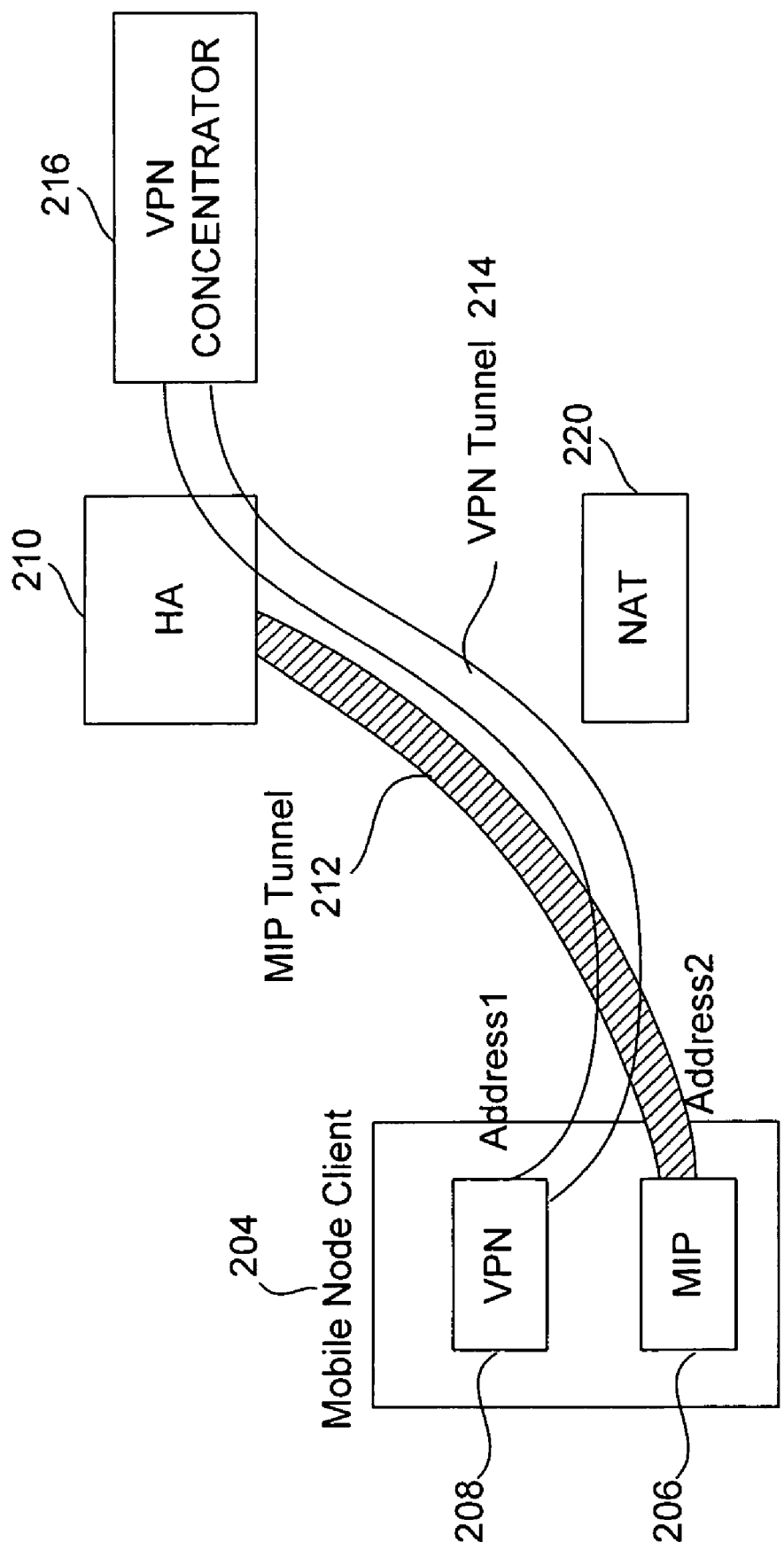
FIG. 2 is a diagram illustrating a system for performing Mobile VPN communications in accordance with various embodiments of the invention.

FIG. 2 is a diagram illustrating a system for performing Mobile VPN communications in accordance with various embodiments of the invention. The system 202 includes a Mobile Node 204 that is a member of a VPN. In order to function in a VPN, the Mobile Node (client) 204 includes a Mobile IP client 206 and a VPN client 208. Specifically, the Mobile IP client 206 performs Mobile IP operations such as Mobile IP tunneling, while the VPN client 208 performs operations such as VPN tunneling. Both clients 206 and 208 may be implemented in hardware and/or software.

When the Mobile Node 204 registers with its Home Agent 210, a Mobile IP tunnel 212 is generated between the Mobile Node 204 and the Home Agent 210. Similarly, a VPN tunnel 214 is established between the VPN client 208 and a VPN headend 216. The VPN tunnel 214 may be used to transmit data packets between the Home Agent 210 and the VPN headend 216, but will not be used simultaneously with the Mobile IP tunnel 212 used to transmit data packets between the Mobile Node 204 and the Home Agent 210.

Figure 1:
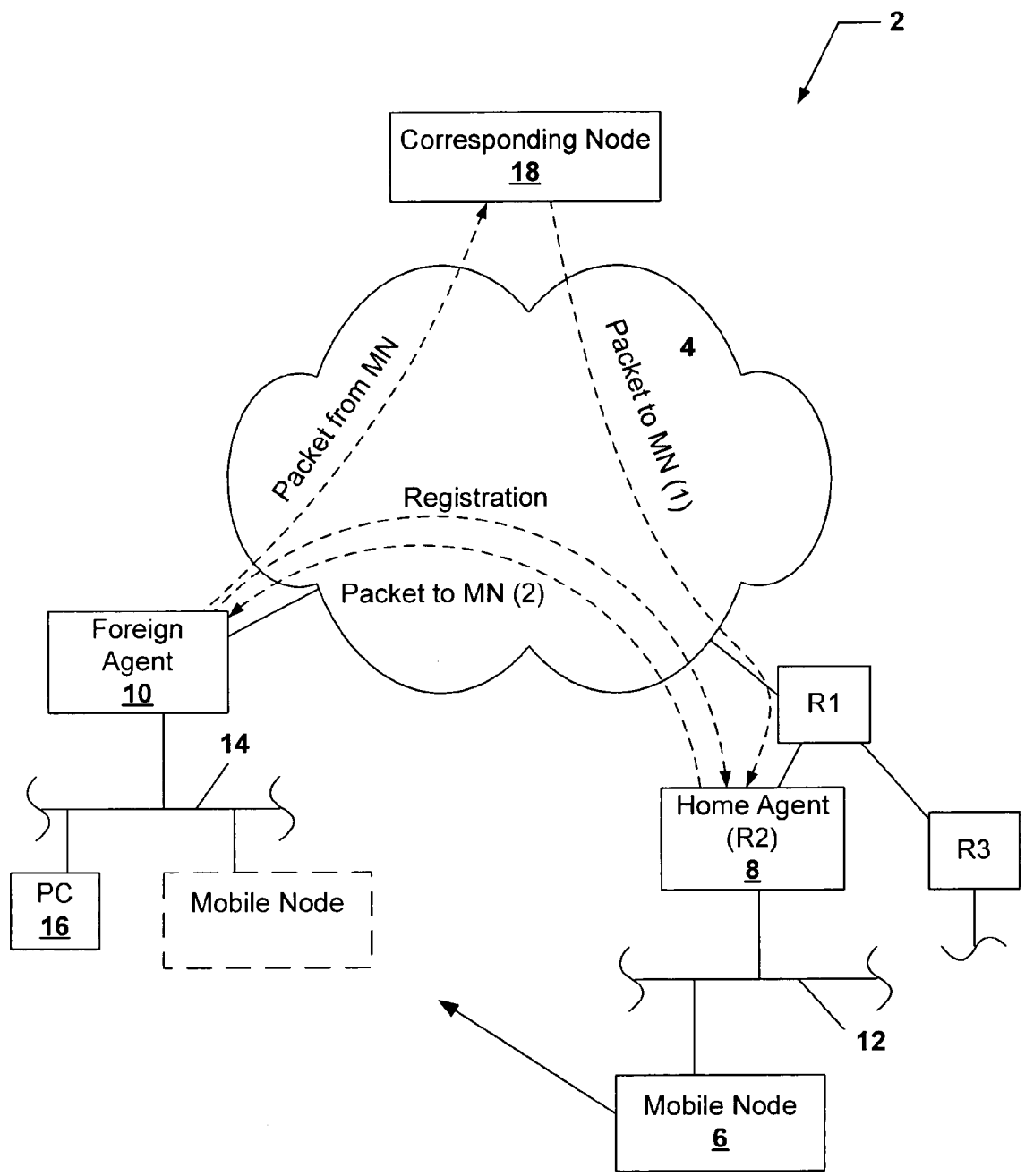
FIG. 1 is a diagram of a Mobile IP network segment and associated environment.

As described above with reference to FIG. 1, a Foreign Agent is optional in Mobile IPv4 and is not implemented in Mobile IPv6. The disclosed embodiments may be implemented in a system including a Foreign Agent. However, since the Foreign Agent performs the Mobile IP tunneling in these instances, the Mobile IP client does not add any extra encapsulation on the airlink. As a result, the disclosed embodiments do not improve performance in a system in which a Foreign Agent is implemented. Accordingly, the disclosed embodiments are only described with reference to a system in which a Foreign Agent is not implemented.

It is also important to note that a NAT module 220 may be implemented in the path between the Mobile Node 204 and the Home Agent 210. Thus, the NAT module 220 is optional. Specifically, although private addresses are commonly used in an enterprise such as a VPN, it is possible that the addresses that are assigned to Mobile Nodes are public addresses. In such an instance, since the network is using publicly routable addresses, a NAT module 220 is not required.

Specifically, devices within the VPN may be configured to use UDP tunneling for NAT traversal. However, it is important to note that depending upon the implementation of the VPN and associated VPN tunneling, UDP tunneling may be used, but is not necessarily required for NAT traversal.

In instances where the VPN client of the Mobile Node 204 and the VPN headend 216 are configured to always use UDP tunneling (for purposes of NAT traversal), if there is no NAT module 220 in the path between the Mobile Node 204 and the Home Agent 210, the additional UDP header merely adds 8 extra bytes of unnecessary information and overhead to the data packet. Since the VPN layer of the Mobile Node 204 is typically unaware of the presence or absence of a NAT module 220 in the path between the Mobile Node 204 and the Home Agent 210, the VPN layer may append a UDP encapsulation header that is used for purposes of NAT traversal. In these instances, since the Mobile IP layer of the Mobile Node 204 can detect the presence or absence of a NAT module 220 in the path between the Mobile Node 204 and the Home Agent 210, the Mobile IP layer of the Mobile Node 204 can remove the UDP encapsulation header when a NAT module 220 is not present before sending a data packet. The Home Agent 210 may then append the UDP encapsulation header before forwarding the data packet to the VPN headend, thereby ensuring that the VPN headend receives the data packet in the appropriate format.

Figure 3:
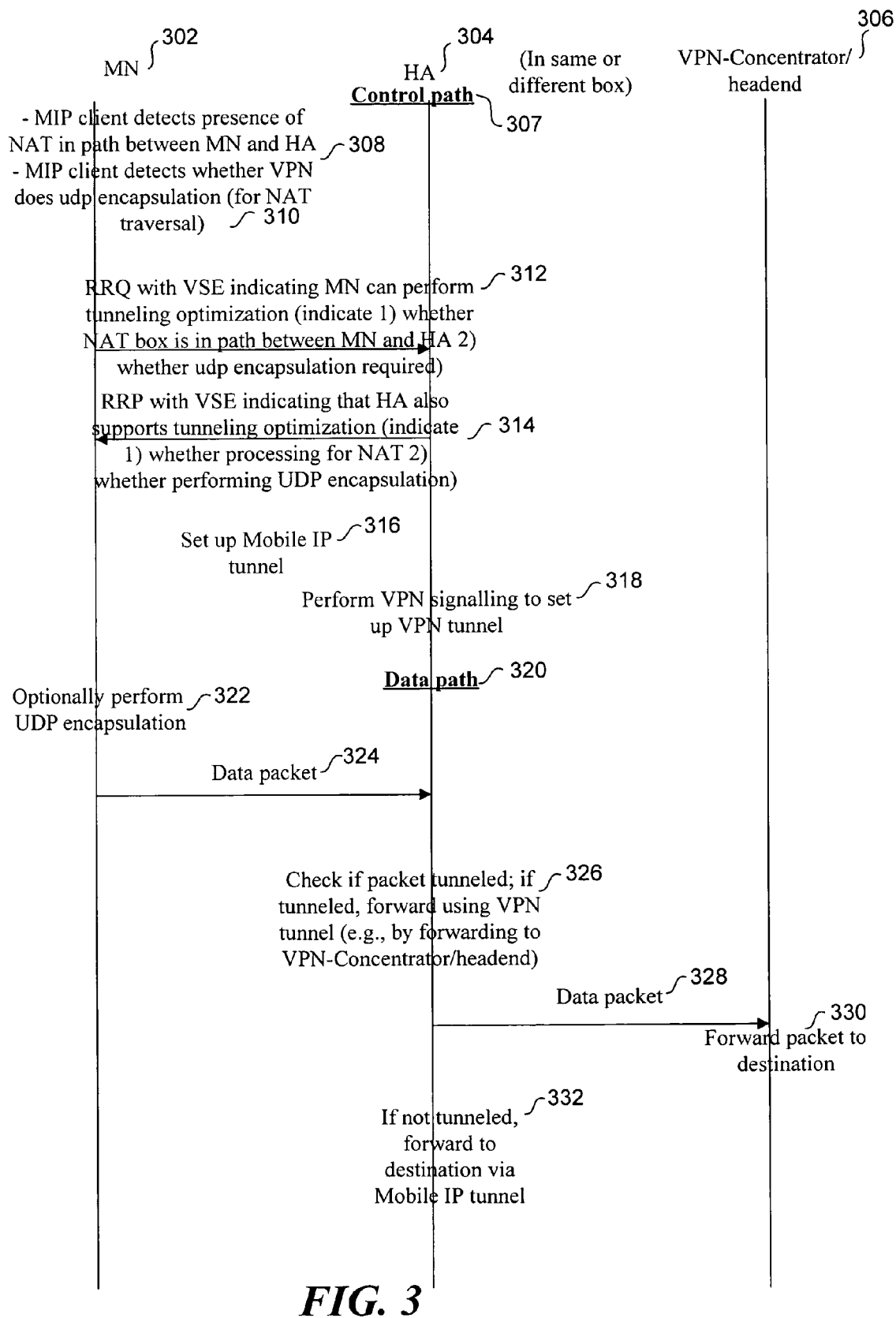
FIG. 3 is a process flow diagram illustrating the general control and data paths for optimizing Mobile VPN communications in accordance with one embodiment of the invention.

FIG. 3 is a process flow diagram illustrating the general control and data paths for optimizing Mobile VPN communications in accordance with one embodiment of the invention. Steps performed by a Mobile Node, Home Agent and VPN headend are represented by vertical lines 302, 304, 306, respectively. The VPN headend and the Home Agent may be implemented as separate devices or as a single device. If the Home Agent and the VPN headend are implemented as separate devices, the Home Agent is aware of an IP address of the VPN headend, in accordance with one embodiment. This may be accomplished, for example, by configuring the Home Agent with the IP address of the VPN headend or sending a notification message including the IP address of the VPN headend to the Home Agent (e.g., from the Mobile Node).

In the control path 307, the Mobile Node can detect whether a NAT device is in the path between the Mobile Node and the Home Agent at 308 in accordance with standard processes, as set forth in RFC 3519, entitled, "Mobile IP Traversal of Network Address Translation (NAT) Devices," published in April, 2003, by Levkowetz et al, which is incorporated herein by reference for all purposes. In addition, the Mobile Node detects whether the VPN performs UDP encapsulation at 310.

In order to register with the Home Agent, the Mobile Node sends a registration request at 312. The Mobile Node may indicate in the registration request that it supports tunneling optimization. In addition, the registration request may also indicate that whether a NAT device is in the path between the Home Agent and the Mobile Node and/or whether UDP encapsulation is required. These indications may be provided in one or more extensions to the registration request. When the Home Agent sends a registration reply to the Mobile Node at 314 indicating whether the registration with the Home Agent was successful, the Home Agent may similarly indicate that it supports tunneling optimization. The Home Agent may also indicate whether it performs UDP encapsulation, as will be described in further detail below. These indications may be provided in one or more extensions to the registration reply. The Mobile Node and Home Agent set up the Mobile IP tunnel at 316. At that time, the Home Agent may store any information it has obtained from the registration request in a table such as its mobility binding table, in which the Home Agent associates the Mobile Node with the Mobile Node's care-of address. For instance, the Home Agent may indicate in the appropriate mobility binding table entry that UDP encapsulation is required and/or a NAT module is in the path between the Home Agent and the Mobile Node. The Mobile Node and VPN headend then perform VPN signaling to set up the VPN tunnel between the Mobile Node and the VPN headend at 318. In accordance with one embodiment, the VPN tunnel is set up upon completion of Mobile IP registration of the Mobile Node with its Home Agent.

Once the control signaling is completed, data packets may be transmitted between the Mobile Node associated with a VPN and a Correspondent Node. The data path 320 illustrates the flow of data packets. As will be described in further detail below, the Mobile Node optionally performs UDP encapsulation at 322 and transmits a data packet at 324. The Home Agent intercepts the data packet and determines whether the data packet has been tunneled via a VPN/UDP tunnel at 326. This may be accomplished by determining whether the data packet has been tunneled via a UDP tunnel or whether a NAT device is in a path between the Home Agent and a Mobile Node. This may be ascertained by obtaining the appropriate information associated with the registered Mobile Node from the appropriate entry in the Home Agent's mobility binding table. When the Home Agent determines that the data packet has been tunneled via a UDP tunnel or a NAT device is in the path between the Home Agent and the Mobile Node, the Home Agent transmits the data packet to a VPN headend via a UDP/VPN tunnel. The Home Agent forwards the data packet to the VPN headend at 328 and the VPN headend forwards the data packet to its destination at 330.

When the Home Agent determines that the data packet has not been tunneled via a UDP tunnel or that a NAT device is not in the path between the Home Agent and the Mobile Node, the Home Agent may forward the data packet to its destination via a Mobile IP tunnel at 332.

A NAT module may or may not be in the path between a Mobile Node and its home network (e.g., Home Agent). When a NAT module is not in the path between the Mobile Node and the home network, NAT traversal need not be performed. In such an instance, in the event that the VPN client is configured to automatically add a UDP header, the UDP header may be removed by the Mobile IP client. In the event that a NAT module is in the path between the Mobile Node and the home network, NAT traversal may be performed by the Mobile Node (e.g., either the Mobile IP client or the VPN client) and/or the Home Agent. In addition, UDP encapsulation may be performed by the Mobile Node (e.g., Mobile IP client or VPN client) or the Home Agent. Various embodiments for transmitting data packets between a Mobile Node in a VPN and a Correspondent Node under each of these scenarios will be described in further detail below with reference to FIGS. 4A, 4B, 5A, and 5B.

Figure 4A:
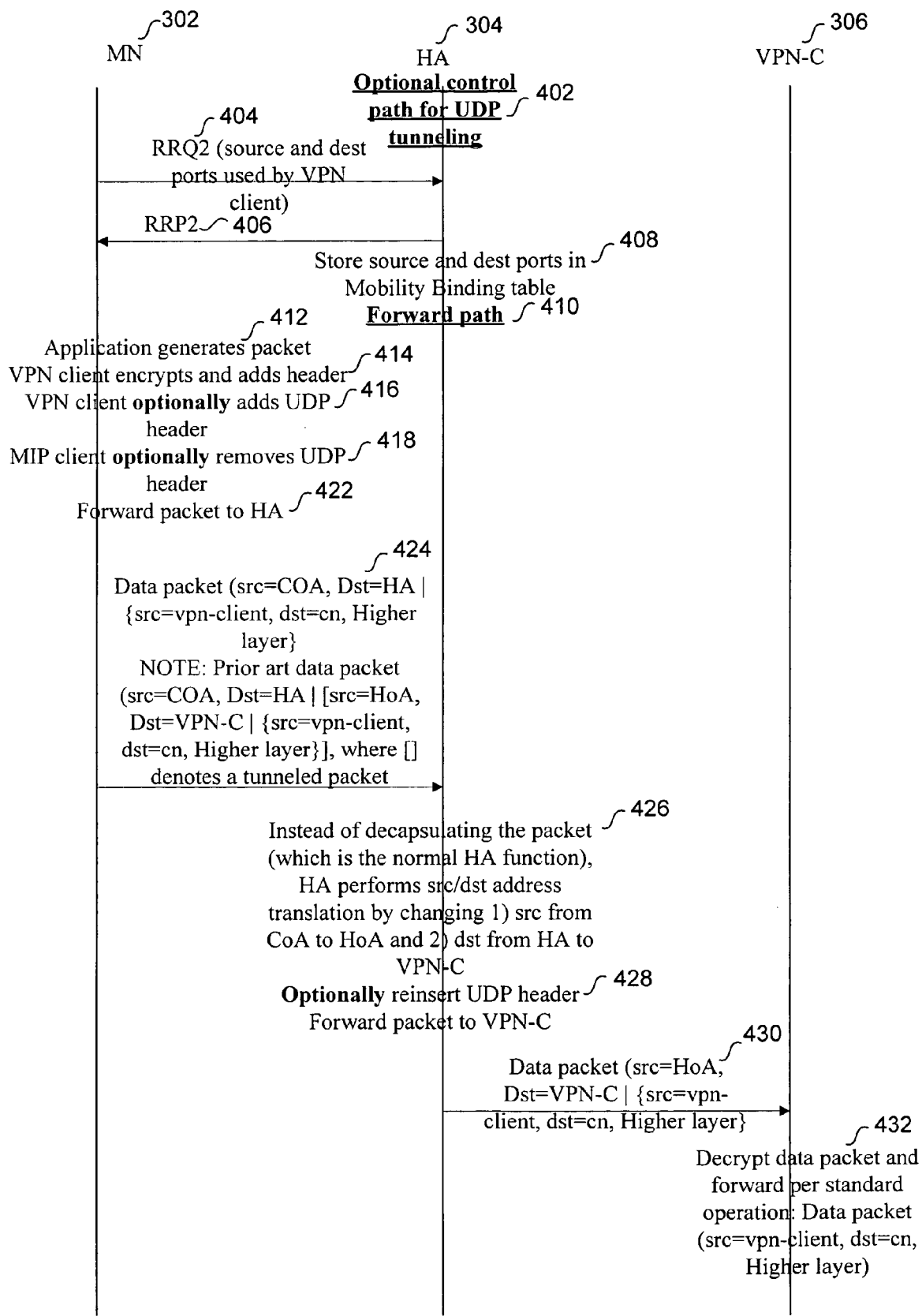
FIG. 4A is a process flow diagram illustrating the forward data path when a NAT box is not in the path from the Mobile Node to its home network in accordance with one embodiment of the invention.

FIG. 4A is a process flow diagram illustrating the forward data path when a NAT box is not in the path from the Mobile Node to its home network in accordance with one embodiment of the invention. In this embodiment, the Mobile IP client does not perform UDP encapsulation. However, the VPN client may perform UDP encapsulation. The control path for UDP tunneling is illustrated at 402. In the event that the VPN client performs UDP encapsulation, the Mobile Node may provide the source port and destination port used by the VPN client to the Home Agent. This may be accomplished by sending a registration request indicating a source port and destination port used by a VPN client of the Mobile Node to the Home Agent at 404. This registration request may be the same registration request described above with reference to FIG. 3, or may be a second registration request. The Home Agent sends a registration reply at 406 acknowledging this registration request. In addition, the Home Agent may associate the Mobile Node with its care-of address, the source port and the destination port at 408. This may be accomplished, for example, by storing this information in an entry in its mobility binding table.

The forward data path 410 includes steps enabling a Mobile Node to send data packets to a Correspondent Node. When an application of the Mobile Node generates a data packet, for example, the VPN client may encrypt the data packet and add a UDP header at 414. While the VPN client is not aware of the presence (or absence) of a NAT device, the Mobile IP client can detect the presence of a NAT device. Thus, if the VPN client does perform UDP encapsulation at 416 and the Mobile IP client has detected that there is no NAT module in the path between the Mobile Node and the Home Agent, the Mobile IP client removes the UDP header at 418. The Home Agent will later add a UDP header such that the VPN headend will receive the data packet in the appropriate format, as will be described in further detail below. The Mobile IP client then forwards the data packet at 422.

As shown at 424, the forwarded data packet no longer includes the VPN header that is typically included in the data packet. In other words, the data packet is not also transmitted to the Home Agent via an additional VPN tunnel. As shown, the VPN header typically includes the home address of the Mobile Node as the source address and the address of the VPN headend as the destination address. Thus, as shown, the original data packet is addressed to a Correspondent Node and the source address is the VPN client. The header of the data packet identifies the care-of address of the Mobile Node as the source address and the address of the Home Agent as the destination address.

When the Home Agent receives the data packet via the Mobile IP tunnel, it typically decapsulates the data packet. However, instead, it performs address translation of both the source and destination IP addresses of the IP header of the data packet at 426 before it forwards the data packet to the VPN headend. Specifically, the Home Agent changes a source address of the data packet from the Mobile Node's care-of address to the Mobile Node's home address. In addition, the Home Agent changes a destination address of the data packet from the address of the Home Agent to an address of a VPN headend.

If UDP encapsulation is required, as indicated to the Home Agent in the registration request it previously received, the Home Agent appends a UDP header to the data packet at 428 prior to forwarding the data packet to the VPN headend. This Home Agent functionality is performed, since the data packet received by the Home Agent from the Mobile Node does not include a UDP header, since it was removed by the Mobile IP client to remove this additional tunneling layer. Specifically, the UDP header identifies the source port and destination port specified in the registration request that the Home Agent received from the Mobile Node. The Home Agent then transmits the data packet to the VPN headend via a VPN tunnel at 430. The VPN headend decrypts the data packet at 432 and forwards the data packet.

Figure 4B:
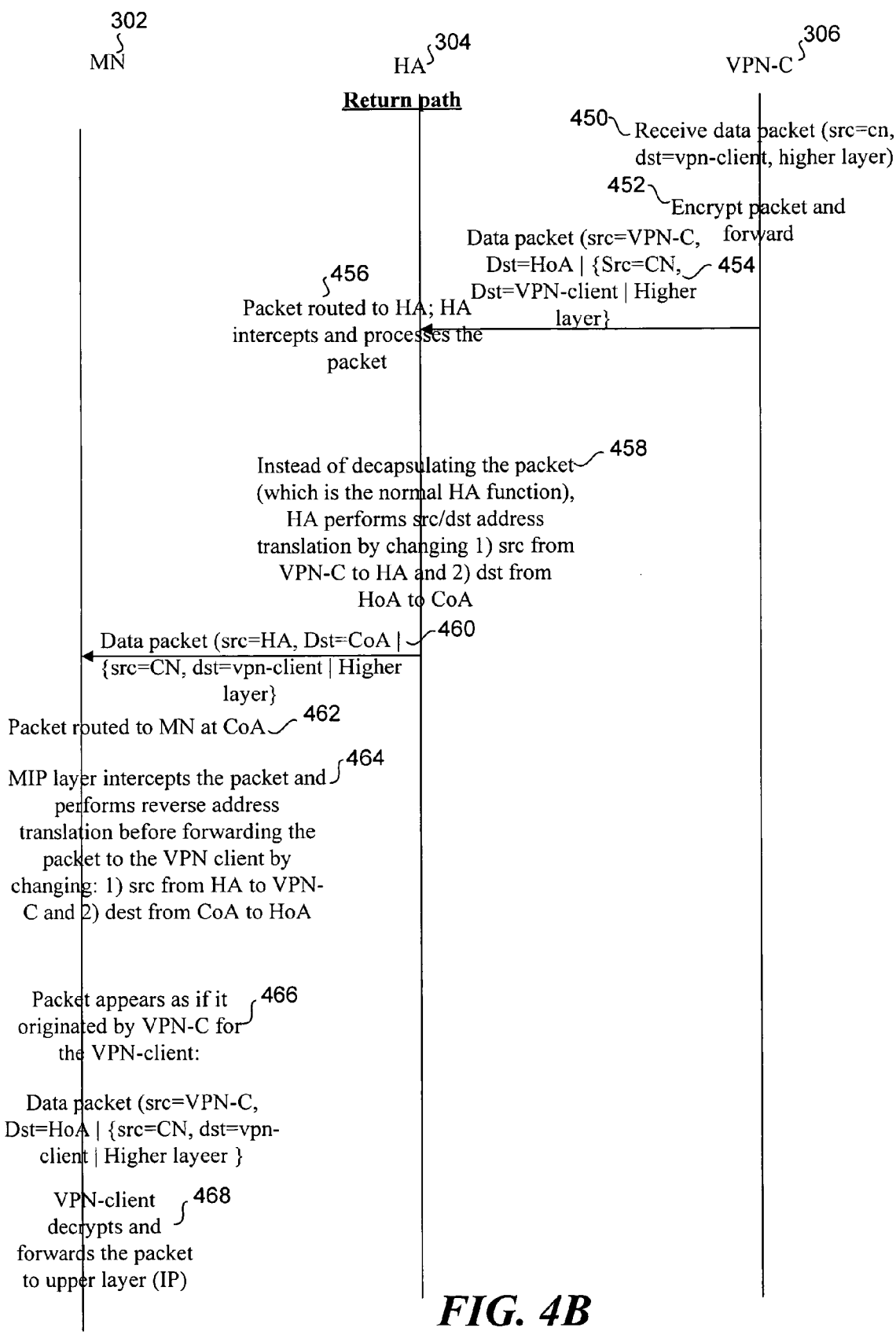
FIG. 4B is a process flow diagram illustrating the reverse data path when a NAT box is not in the path from the Mobile Node to its home network in accordance with one embodiment of the invention.

FIG. 4B is a process flow diagram illustrating the reverse data path when a NAT box is not in the path from the Mobile Node to its home network in accordance with one embodiment of the invention. When the VPN headend receives a data packet from a Correspondent Node at 450, it encrypts the packet and forwards the packet at 452 to the Home Agent via a VPN tunnel. As shown at 454, the source IP address of the data packet is the address of the Correspondent Node and the destination IP address of the data packet is the address of the VPN client. Once the data packet has been encrypted, the source IP address of the packet header is the address of the VPN headend and the destination IP address of the packet header is the home address of the Mobile Node, since the data packet has been addressed by the VPN headend for transmission via a VPN tunnel.

When the Home Agent receives the data packet, it processes the data packet at 456. As shown at 458, rather than decapsulating the packet, it changes a source address of the data packet header from an address of a VPN headend to an address of the Home Agent, and changes a destination address of the data packet header from a home address of the Mobile Node to a care-of address of the Mobile Node. The Home Agent then transmits the data packet to the care-of address of the Mobile Node via only a Mobile IP tunnel at 460 and the packet is routed to the Mobile Node at 462. Thus, the data packet is not transmitted from the Home Agent to the Mobile Node via a VPN tunnel.

When the Mobile Node receives a data packet from a Home Agent, the data packet is intercepted by a Mobile IP layer of the Mobile Node via a Mobile IP tunnel. The Mobile IP client performs reverse address translation by modifying a source address of the data packet from an address of the Home Agent to an address of the VPN headend, and modifies a destination address of the data packet from the care-of address of the Mobile Node to the home address of the Mobile Node at 464. The Mobile IP client then forwards the modified data packet to a VPN client of the Mobile Node such that the data packet appears as if it originated at the VPN headend at 466. The VPN client then decrypts the data packet and forwards the decrypted data packet to the Mobile IP layer at 468.

Figure 5A:
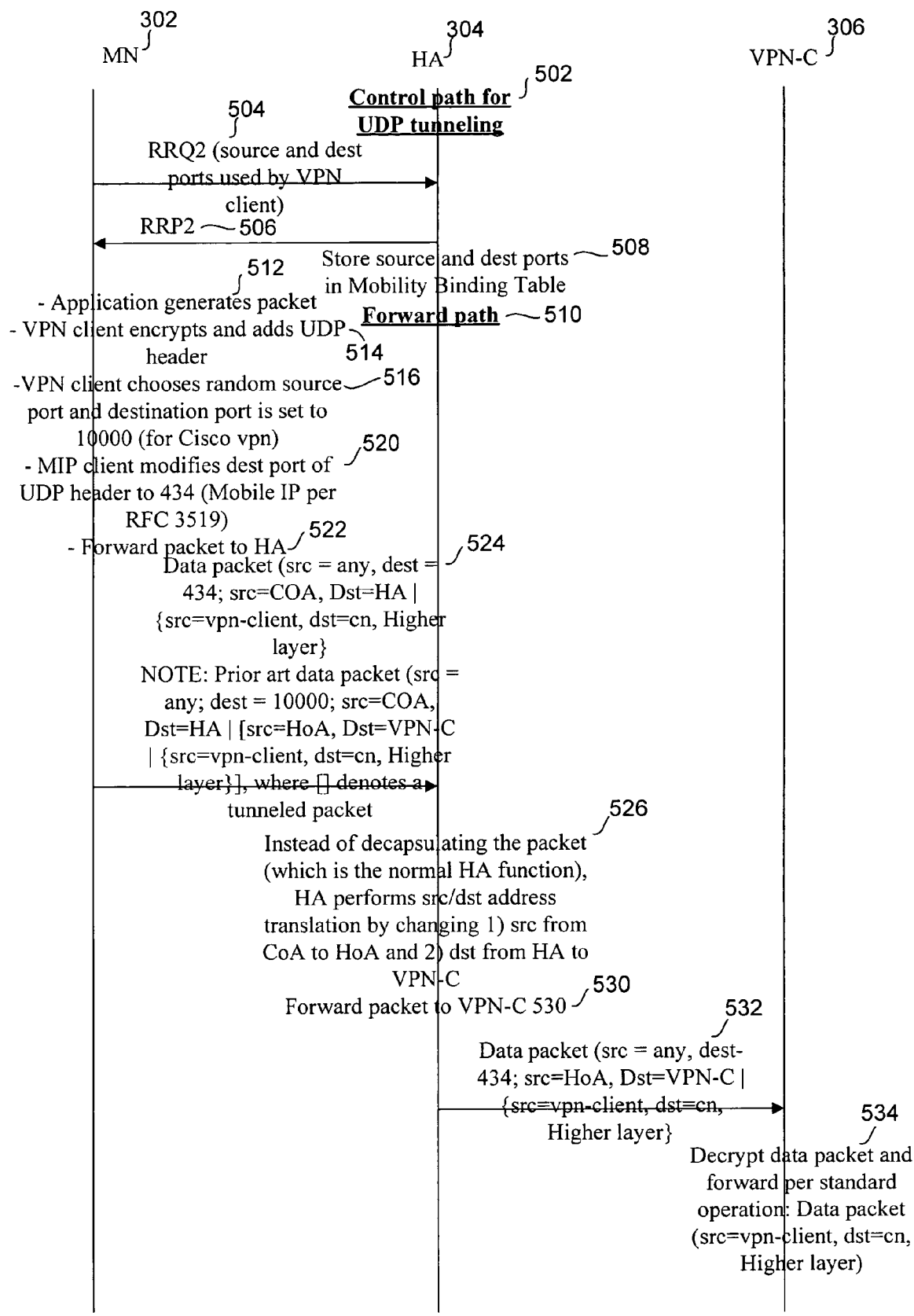
FIG. 5A is a process flow diagram illustrating the data path when a NAT box is in the path from the Mobile Node to its home network and the VPN client performs UDP encapsulation.

FIG. 5A is a process flow diagram illustrating the data path when a NAT box is in the path from the Mobile Node to its home network and the VPN client performs UDP encapsulation. In this embodiment, the Mobile IP client does not perform UDP encapsulation. However, the VPN client performs UDP encapsulation. The control path for UDP tunneling is illustrated at 502. In the event that the VPN client performs UDP encapsulation, the Mobile Node may provide the source port and destination port used by the VPN client to the Home Agent. This may be accomplished by sending a registration request indicating a source port and destination port used by a VPN client of the Mobile Node to the Home Agent at 504. This registration request may be the same registration request described above with reference to FIG. 3, or may be a second registration request. The Home Agent sends a registration reply at 506 acknowledging this registration request. In addition, the Home Agent may associate the Mobile Node with its care-of address, the source port and the destination port at 508. This may be accomplished, for example, by storing this information in an entry in its mobility binding table.

The forward data path 510 includes steps enabling a Mobile Node to send data packets to a Correspondent Node. When an application of the Mobile Node generates a data packet at 512, the VPN client encrypts the data packet and appends a UDP header at 514. In accordance with one embodiment, the VPN client chooses a random source port and sets the destination port to 10,000 for Cisco's VPN, for example, at 516. The Mobile IP client then modifies the destination port at 520 to port 434, which is the Mobile IP port as specified in RFC 3519. The Mobile Node then forwards the data packet to the Home Agent at 522. As shown at 524, the data packet includes a UDP header, and includes an IP header in which the source address is the care-of address of the Mobile Node and the destination address is the address of the Home Agent. The data packet is sent by the VPN client to the Correspondent Node. However, the data packet is transmitted by a Mobile IP tunnel, but not via a VPN tunnel.

When the Home Agent receives the data packet at 526 via the Mobile IP tunnel, it typically decapsulates the data packet. However, instead, it performs address translation of both the source and destination IP addresses of the IP header of the data packet at 528 before it forwards the data packet to the VPN headend at 530 via a VPN tunnel. Specifically, the Home Agent changes a source address of the data packet from the Mobile Node's care-of address to the Mobile Node's home address. In addition, the Home Agent changes a destination address of the data packet from the address of the Home Agent to an address of a VPN headend. As shown at 532, the data packet includes the UDP header described above. When the VPN headend receives the data packet, it decrypts the data packet and forwards the data packet to the Correspondent Node at 534.

Figure 5B:
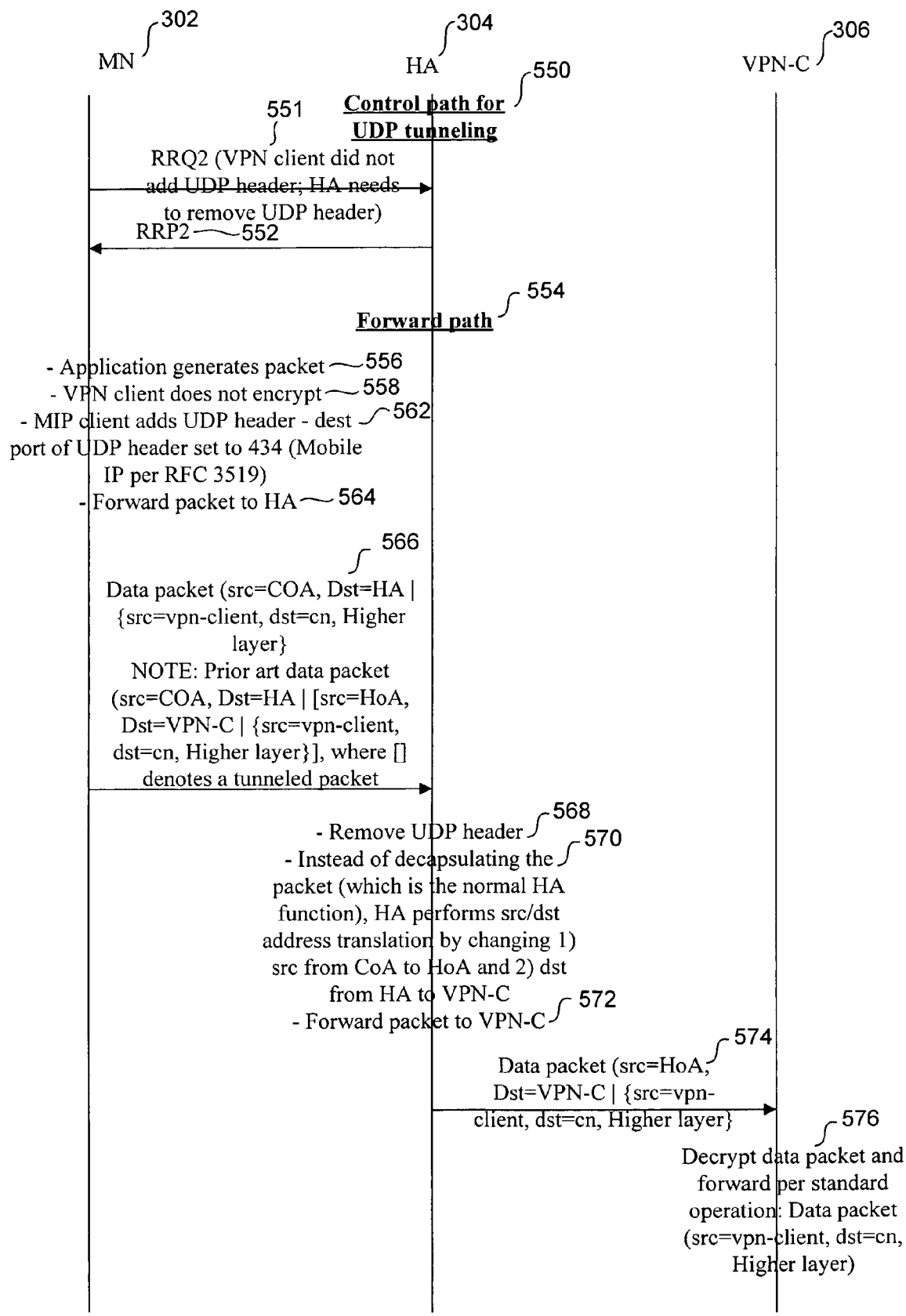
FIG. 5B is a process flow diagram illustrating the data path when a NAT box is in the path from the Mobile Node to its home network and the MIP client performs UDP encapsulation.

FIG. 5B is a process flow diagram illustrating the data path when a NAT box is in the path from the Mobile Node to its home network and the MIP client performs UDP encapsulation. In this embodiment, the Mobile IP client, rather than the VPN client, performs UDP encapsulation. The control path for UDP tunneling is illustrated at 550. The Mobile Node sends a message such as a registration request at 551 indicating that a VPN client of the Mobile Node does not add a UDP header and/or the Home Agent needs to remove a UDP header added by a Mobile IP client of the Mobile Node. Such indications may be provided in the registration request via an extension to the registration request. This registration request may be the same registration request described above with reference to FIG. 3, or may be a second registration request. The Home Agent may then send a message such as a registration reply acknowledging the message sent by the Mobile Node at 552.

The forward data path 554 includes steps enabling a Mobile Node to send data packets to a Correspondent Node. When an application of the Mobile Node generates a data packet at 556, the VPN client does not encrypt the packet or append a UDP header at 558 as described above with reference to FIG. 5A. Rather, the Mobile IP client encrypts the data packet and appends a UDP header at 562. In accordance with one embodiment, the Mobile IP client chooses a random source port and sets the destination port to port 434, which is the Mobile IP port as specified in RFC 3519. The Mobile Node then forwards the data packet to the Home Agent at 564.

As shown at 566, the data packet includes a UDP header, and includes an IP header in which the source address is the care-of address of the Mobile Node and the destination address is the address of the Home Agent. The data packet is sent by the VPN client to the Correspondent Node. However, the data packet is transmitted by a Mobile IP tunnel, but not via a VPN tunnel.

When the Home Agent receives the data packet via the Mobile IP tunnel, it removes the UDP header at 568. In addition, it performs address translation of both the source and destination IP addresses of the IP header of the data packet at 570 before it forwards the data packet to the VPN headend at 572 via a VPN tunnel. Specifically, the Home Agent changes a source address of the data packet from the Mobile Node's care-of address to the Mobile Node's home address. In addition, the Home Agent changes a destination address of the data packet from the address of the Home Agent to an address of the VPN headend. As shown at 574, when the VPN headend receives the data packet, it decrypts the data packet and forwards the data packet to the Correspondent Node at 576.

The disclosed embodiments support optimized communications between a Mobile Node that is a member of a VPN and a Correspondent Node. This is accomplished by transporting data packets between two nodes via either a Mobile IP tunnel or a VPN tunnel, but not both tunnels simultaneously. The above-described embodiments are merely illustrative. Accordingly, alternative methods and packet formats are contemplated for accomplishing this optimization.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Home Agent, or VPN headend) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. Moreover, in a preferred embodiment, the Home Agent of this invention may be a specially configured router such as specially configured router model 3200 available from Cisco Systems, Inc. of San Jose, Calif. A general structure for some of these machines will appear from the description given below.

Generally, the route optimization technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid route optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the route optimization system may be implemented on a general-purpose network host machine such as a personal computer or workstation. Further, the invention may be at least partially implemented on a card (e.g., an interface card) for a network device or a general-purpose computing device.

Figure 6:
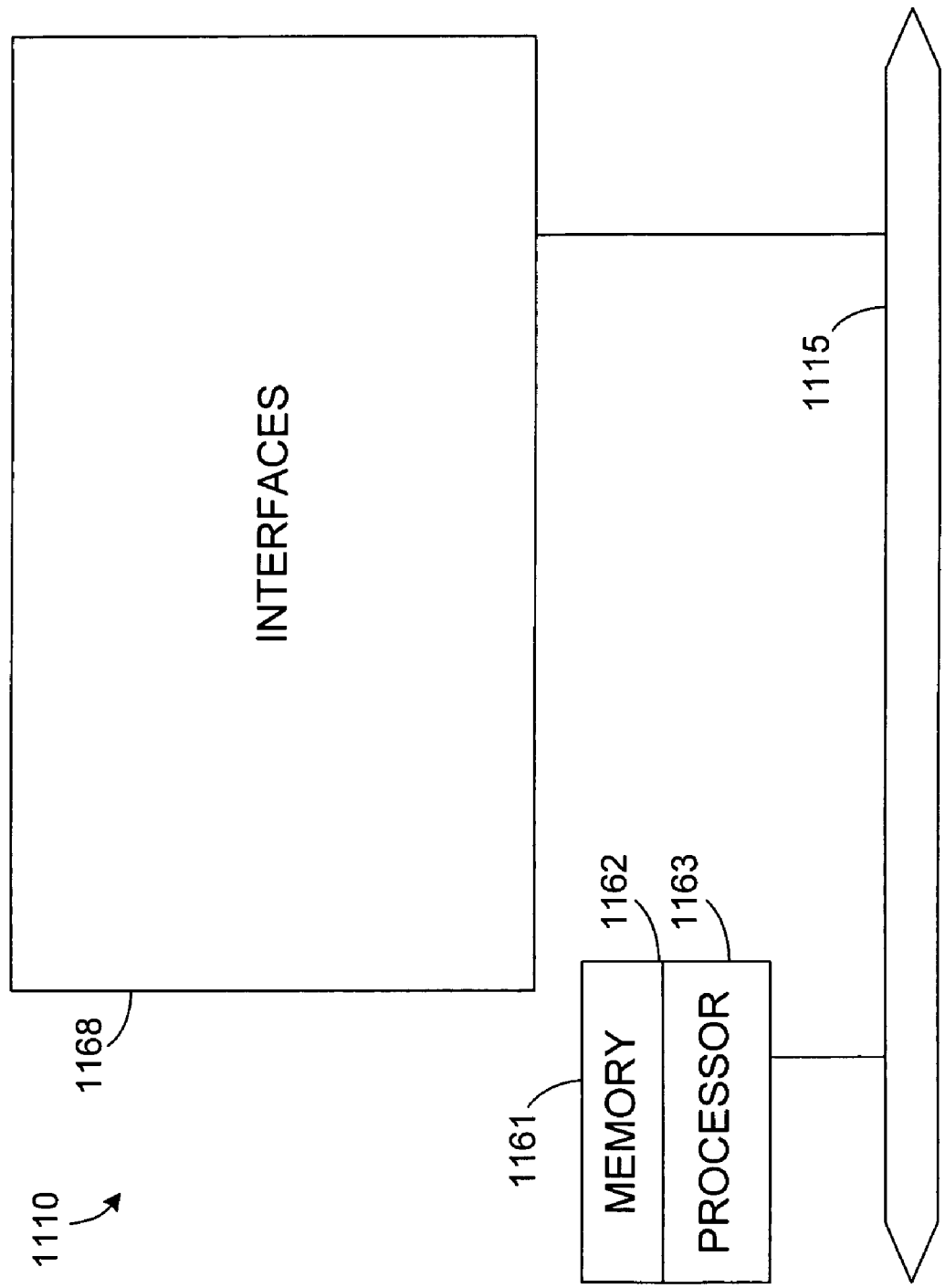
FIG. 6 is a diagrammatic representation of a router in which embodiments of the present invention may be implemented.

Referring now to FIG. 6, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the disclosed message formats and methods are merely illustrative, and therefore other messages and methods may be used to establish Mobile VPN optimization. Moreover, although the example described refers to IPv4, the present invention may be used with IP addresses that conform to other versions of IP. Therefore, the described embodiments should be taken as illustrative and not restrictive, and the invention should not be limited to the details given herein but should be defined by the following claims and their full scope of equivalents.

What is claimed is:

1. A method, comprising:
   transmitting a data packet between a Mobile Node supporting Mobile IP and a Home Agent via a Mobile IP tunnel without transmitting the data packet between the Mobile Node and the Home Agent via a VPN tunnel, wherein the Mobile Node is a member of a VPN; and
   transmitting the data packet between the Home Agent and a VPN headend via a VPN tunnel without transmitting the data packet between the Home Agent and the VPN headend via the Mobile IP tunnel, thereby enabling the data packet to be transmitted between the Mobile Node and the VPN headend.

2. The method as recited in claim 1, wherein the data packet is not simultaneously transmitted via both the Mobile IP tunnel and the VPN tunnel.

3. The method as recited in claim 1, wherein the Mobile Node is outside the VPN.

4. In a Mobile Node supporting Mobile IP, wherein the Mobile Node is a member of a VPN, a method of optimizing Mobile IP communications, comprising:
   generating a data packet;
   setting up a Mobile IP tunnel between the Mobile Node and a Home Agent;
   setting up a VPN tunnel between the Mobile Node and a VPN headend; and
   transmitting the data packet to the Home Agent via only the Mobile IP tunnel, thereby enabling the data packet to be transmitted by the Home Agent to the VPN headend via the VPN tunnel.

5. The method as recited in claim 4, wherein the VPN tunnel is used to transmit data packets to the Mobile Node from a Correspondent Node such that the data packets are only transmitted via the VPN tunnel to the Home Agent, thereby enabling the Home Agent to transmit the data packets via the Mobile IP tunnel to the Mobile Node without transmitting the data packets to the Mobile Node via the VPN tunnel.

6. The method as recited in claim 4, further comprising:
   appending a UDP header to the data packet by a VPN client of the Mobile Node; and
   removing the UDP header from the data packet by a Mobile IP client of the Mobile Node.

7. The method as recited in claim 4, further comprising:
   appending a UDP header to the data packet by a VPN client of the Mobile Node; and
   modifying a destination port of the UDP header by a Mobile IP client of the Mobile Node to port 434.

8. The method as recited in claim 4, further comprising:
   sending a registration request indicating at least one of a VPN client of the Mobile Node does not add a UDP header or the Home Agent needs to remove a UDP header added by a Mobile IP client of the Mobile Node.

9. The method as recited in claim 8, further comprising:
   appending a UDP header to the data packet by a Mobile IP client of the Mobile Node, wherein a destination port of the UDP header is port 434.

10. The method as recited in claim 4, wherein the VPN tunnel is not used to transmit data packets between the Mobile Node and the Home Agent.

11. The method as recited in claim 4, wherein the VPN tunnel is not used to transmit data packets by the Mobile Node to the Home Agent.

12. The method as recited in claim 4, wherein the VPN tunnel is not used to transmit data packets from the Home Agent to the Mobile Node.

13. The method as recited in claim 4, wherein the Mobile Node is outside the VPN.

14. In a Home Agent supporting Mobile IP, a method, comprising:
   receiving a data packet from a VPN headend via a VPN tunnel;
   changing a source address of the data packet from an address of a VPN headend to an address of the Home Agent;

changing a destination address of the data packet from a home address of the Mobile Node to a care-of address of the Mobile Node; and transmitting the data packet to the care-of address of the Mobile Node via a Mobile IP tunnel, wherein the Mobile Node is a member of a Virtual Private Network.

15. The method as recited in claim 14, wherein the data packet is not transmitted from the Home Agent to the Mobile Node via a VPN tunnel.

16. In a Mobile Node, a method of optimizing Mobile IP communications, comprising:

receiving a data packet from a Home Agent at a Mobile IP layer of the Mobile Node via a Mobile IP tunnel;

modifying a source address of the data packet from an address of a Home Agent to an address of a VPN headend;

modifying a destination address of the data packet from a care-of address of the Mobile Node to a home address of the Mobile Node; and forwarding the modified data packet to a VPN client of the Mobile Node such that the data packet appears as if it originated at the VPN headend.

17. The method as recited in claim 16, further comprising:

decrypting the data packet by the VPN client; and forwarding the decrypted data packet to the Mobile IP layer of the Mobile Node.

18. In a Home Agent supporting Mobile IP, a method of optimizing Mobile IP communications, comprising:

receiving a data packet from a Mobile Node via a Mobile IP tunnel, wherein the Mobile Node is a member of a Virtual Private Network;

modifying a source IP address of the data packet from the Mobile Node's care-of address to the Mobile Node's home address;

modifying a destination IP address of the data packet from the address of the Home Agent to an address of a VPN headend; and transmitting the data packet to the VPN headend via a VPN tunnel.

19. The method as recited in claim 18, wherein the data packet is not received via a VPN tunnel.

20. The method as recited in claim 18, further comprising:

receiving a registration request indicating at least one of a VPN client of the Mobile Node does not add a UDP header or the Home Agent needs to remove a UDP header added by a Mobile IP client of the Mobile Node.

21. The method as recited in claim 18, wherein the data packet received includes a UDP header, the method further comprising:

removing the UDP header from the data packet prior to transmitting the data packet to the VPN headend.

22. The method as recited in claim 18, further comprising:

receiving a registration request from the Mobile Node, the registration request indicating at least one of whether a NAT device is in the path between the Home Agent and the Mobile Node or whether UDP encapsulation is required.

23. The method as recited in claim 22, further comprising:

sending a registration reply to the Mobile Node indicating that the Home Agent performs UDP encapsulation.

24. The method as recited in claim 18, further comprising:

receiving a registration request from the Mobile Node, the registration request indicating that the Mobile Node supports tunneling optimization.

25. The method as recited in claim 24, further comprising:

sending a registration reply from the Home Agent to the Mobile Node, the registration reply indicating that the Home Agent also supports tunneling optimization.

26. The method as recited in claim 18, wherein the Home Agent and the VPN headend are implemented in a single device.

27. The method as recited in claim 18, wherein the Home Agent is aware of an IP address of the VPN headend.

28. The method as recited in claim 18, further comprising:

receiving notification of an IP address of the VPN headend from the Mobile Node.

29. The method as recited in claim 18, further comprising:

receiving a registration request indicating a source port and destination port used by a VPN client of the Mobile Node.

30. The method as recited in claim 29, further comprising:

associating the Mobile Node with its care-of address, the source port and the destination port.

31. The method as recited in claim 29, further comprising:

appending a UDP header to the data packet prior to forwarding the data packet to the VPN headend;

wherein the data packet received by the Home Agent from the Mobile Node does not include a UDP header.

32. The method as recited in claim 31, wherein the UDP header identifies the source port and destination port specified in the registration request received from the Mobile Node.

33. The method as recited in claim 18, further comprising:

wherein modifying the source IP address and modifying the destination IP address are performed prior to forwarding the data packet to the VPN headend via the VPN tunnel.

34. A Home Agent supporting Mobile IP, comprising:

a processor; and a memory, the processor and the memory being adapted for:

receiving a data packet from a VPN headend via a VPN tunnel;

changing a source address of the data packet from an address of a VPN headend to an address of the Home Agent;

changing a destination address of the data packet from a home address of the Mobile Node to a care-of address of the Mobile Node; and transmitting the data packet to the care-of address of the Mobile Node via a Mobile IP tunnel, wherein the Mobile Node is a member of a Virtual Private Network.

35. The Home Agent as recited in claim 34, wherein the data packet is not transmitted from the Home Agent to the Mobile Node via a VPN tunnel.

36. A Mobile Node adapted for optimizing Mobile IP communications, comprising:

a processor; and a memory, the processor and the memory being adapted for:

receiving a data packet from a Home Agent at a Mobile IP layer of the Mobile Node via a Mobile IP tunnel;

modifying a source address of the data packet from an address of a Home Agent to an address of a VPN headend;

modifying a destination address of the data packet from a care-of address of the Mobile Node to a home address of the Mobile Node; and forwarding the modified data packet to a VPN client of the Mobile Node such that the data packet appears as if it originated at the VPN headend.

37. The Mobile Node as recited in claim 36, at least one of the processor or the memory being further adapted for:
   decrypting the data packet by the VPN client; and
   forwarding the decrypted data packet to the Mobile IP layer of the Mobile Node.

38. A Home Agent supporting Mobile IP and being adapted for optimizing Mobile IP communications, comprising:
   a processor; and
   a memory, the processor and the memory being adapted for:
   receiving a data packet from a Mobile Node via a Mobile IP tunnel, wherein the Mobile Node is a member of a Virtual Private Network;
   modifying a source IP address of the data packet from the Mobile Node's care-of address to the Mobile Node's home address;
   modifying a destination IP address of the data packet from the address of the Home Agent to an address of a VPN headend; and
   transmitting the data packet to the VPN headend via a VPN tunnel.

39. The Home Agent as recited in claim 38, wherein the data packet is not received via a VPN tunnel.

40. A Mobile Node supporting Mobile IP, wherein the Mobile Node is a member of a VPN, comprising:
   a processor; and
   a memory, the processor and the memory being adapted for:
   generating a data packet;
   setting up a Mobile IP tunnel between the Mobile Node and a Home Agent;
   setting up a VPN tunnel between the Mobile Node and a VPN headend, thereby enabling data packets to be transmitted between the Home Agent and the VPN headend; and
   transmitting the data packet to the Home Agent via only the Mobile IP tunnel, thereby enabling the Home Agent to transmit the data packet to the VPN headend via the VPN tunnel;
   wherein the data packet is not simultaneously transmitted via both the Mobile IP tunnel and the VPN tunnel.

* * * * *

UNITED STATES PATENT AND TRADEMARK OFFICE
CERTIFICATE OF CORRECTION

PATENT NO. : 7,602,786 B2
APPLICATION NO. : 11/177454
DATED : October 13, 2009
INVENTOR(S) : Dommety et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this

Fifth Day of October, 2010

David J. Kappos
*Director of the United States Patent and Trademark Office*